United States Patent Office 3,073,566
Patented Jan. 15, 1963

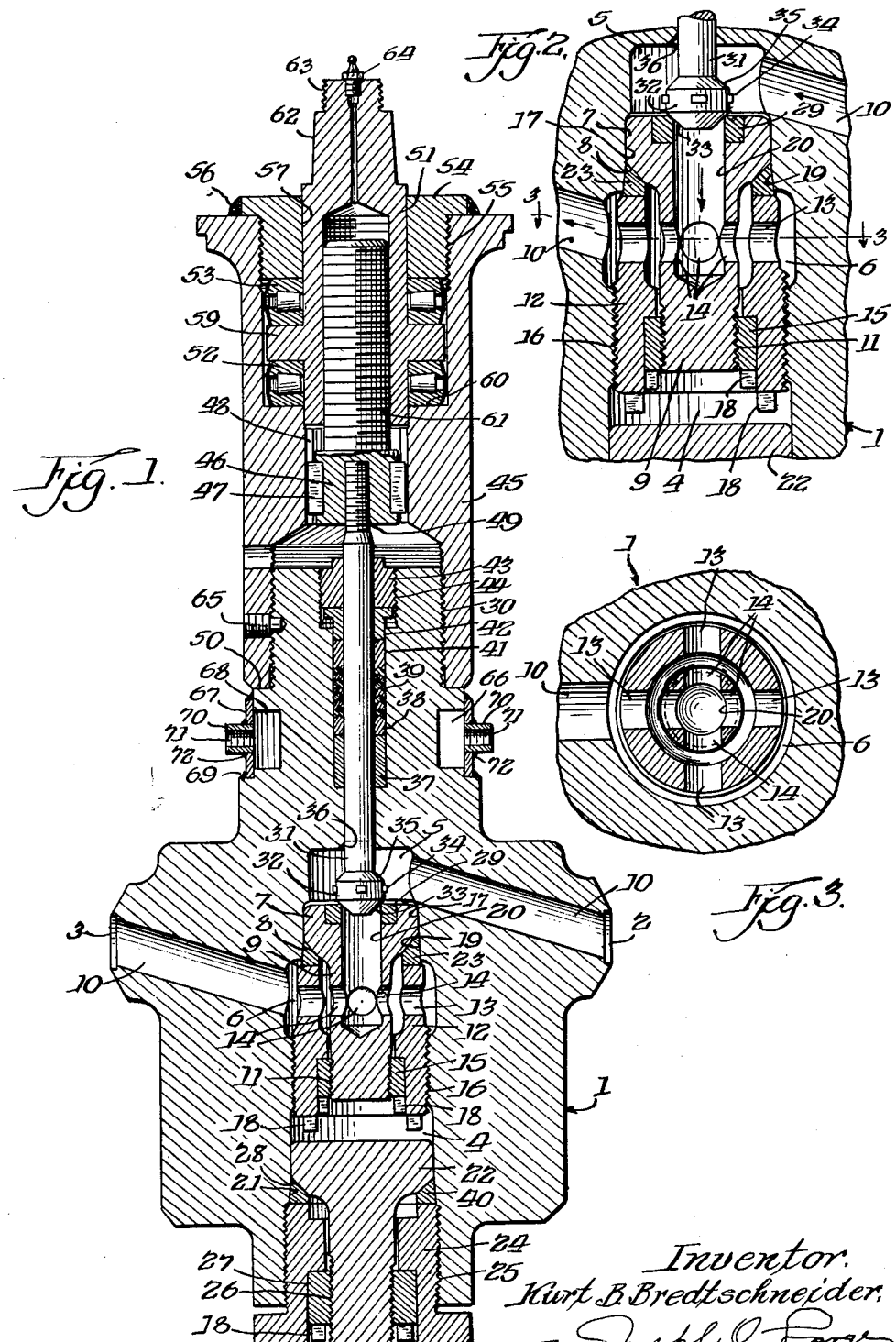

3,073,566
HIGH PRESSURE VALVE
Kurt B. Bredtschneider, Chicago, Ill., assignor to Crane Co., Chicago, Ill., a corporation of Illinois
Filed Mar. 6, 1961, Ser. No. 93,378
3 Claims. (Cl. 251—362)

This invention relates generally to valves, and, more particularly, it is concerned with a valve suitable for severe throttling service under high pressure fluid conditions. It should be understood here that when reference is made to high-pressure high-temperature service, it relates to such extremely high pressure conditions of the order of 40,500 pounds per square inch working pressure, and at 625 degrees Fahrenheit working temperature, for example, in which to determine the suitability of the valve for such severe conditions, fluid test pressures of the order of 44,500 pounds per square inch are applied.

Thus, it will be appreciated from the outset that under these unusually severe service conditions, it becomes desirable to provide a valve design in which the valve stem and valve seat can be replaced from time to time as deemed necessary without removing the valve itself from the pipe line. The valve in many instances may be actually welded or otherwise applied in a semi-permanent manner to the pipeline so as to make removal of the valve relatively inconvenient and expensive.

Thus, it is one of the more important objects of this invention to provide a valve capable of performing satisfactorily on such rigorous service, as referred to. Preferably, the instant valve is so installed and operated with the line fluid pressure applied above the said valve seat and thereby permits the valve seat tightness against the valve body to take place by the application of the line fluid pressure sealing principle assisting in the maintaining of said tightness.

Another object is to provide for a valve in which the valve casing permits the installation of the valve stem, closure or disc and the valve seat through the body opening, the latter opening being closed during actual service by means of a pressure seal bonnet or plug.

Other objects and advantages will become more readily apparent upon proceeding with the following description read in light of the drawing, in which:

FIG. 1 is a sectional assembly view of a valve embodying my invention;

FIG. 2 is a magnified view of the combined valve stem, seat, closure member and body construction of the invention; and FIG. 3 is a fragmentary transverse enlarged sectional view taken across the valve ports.

Similar reference numerals refer to similar parts throughout the several views.

Referring now to the drawings and particularly to FIG. 1, the valve body or casing generally designated 1 is provided with the inlet end 2 and the outlet end 3 for the usual connection to a pipe line (not shown). While welding connections are indicated, it is, of course, obvious that other forms of line attachment may be used.

The respective inlet and outlet are provided with the ports 10, the latter communicating with the centrally positioned valve chamber 4 within the valve casing. It should be noted that the valve chamber 4 is provided with annularly arranged steps of gradually reduced straight diameters defined at its lower end by an enlarged chamber and at its upper end by the smaller diameter chamber 5. The straight diameters forming the stepped chamber 4 apply through except for a pair of annular seating surfaces specifically referred to later in the description. It also has the intermediate portion 6 which is annularly enlarged to provide sufficient flow area therethrough. The seat 7 is of circular or cylindrical configuration and is received within the body straight bored portion at 17.

Thus, it will be apparent that the enlarged cylindrical head portion of the seat 7 extends to the plane where the annular bevelled undersurface 8 extends on its outer periphery downwardly and inwardly to form the elongated depending shank 9 threaded at 11. Extending around the threaded shank 9 is the hollow threaded retaining nut 12 which is ported transversely at 13 as shown more clearly in FIG. 3. Likewise, it will be observed that the hollow shank 9 is ported similarly at 14. Each of the ports 13 and 14 through the intermediate chamber portion 6 thus communicate with the valve outlet at 3 through the left-hand lower passage 10. A round threaded lock nut 15 engages the threaded end 11 of the hollow shank 9 to draw the seat 7 and the retaining nut 12 together and holds the pressure seal ring 23 in place for reasons hereinafter made clear. The ported retaining nut 12 is threadedly held at 16 within the body 1 as shown. For the purpose of effecting the respective threaded attachments of the inner and outer nuts, the end disposed lugs 18 are provided on the tightening members 12, 15, and 27.

As previously indicated, the body chamber 4 at its upper portion below the plane of the body inlet port 10 is annularly tapered at 19 and is similarly tapered at its lower end portion as indicated at 21. As indicated, the extension downward of the body cylindrical surface 17 continues preferably to a plane where it is intersected by the annular tapered seating surface 19. Thus the retaining nut 12 holds the pressure seal ring 23 in place. Further, the nut 15 engaging the threaded shank portion 11 of the seat 7 moves the said seat downwardly and its underside surface 8 contacts the inside tapered seat ring 23. It should be understood that the latter step causes the ring 23 to be spread outwardly or expanded to thus form the initial tightening between the ring 23 and the body bevelled inner surface 19.

Within the body lower tapered portion 21, a body seal plug 22 is inserted and is provided on its outer peripheral undersurface portion with a sealing ring 40. In this connection, it should be noted that in the same manner as just described a sealing ring 23 is applied. Both sealing rings have the outwardly tapered annular surfaces thereon engage the respective tapered annular surfaces 19 and 21 and, as will hereinafter become apparent, are held under high compression load axially applied to provide a fluid tight seal between the seat and body and between the body seal plug and body.

To retain the body seal plug under high compression load with relation to the ring or sealing member 40, the lower retaining nut 24 is threadedly received on the body internal threads 25 in the manner similar to that previously described in retaining the body seat 7 in fluid sealing relation to the body. A retaining nut 27 is provided which is mounted on the threads 26 and is similarly fitted with the lugs 18 to enable the tightening and holding of the retaining member 27 in position. This construction thereby holds the sealing ring member 40 against the bevelled surfaces 28 and also firmly against substantial axial movement. The enlarged cylindrical head of the member 22 likewise is received preferably within a straight cylindrical surface in the body above the tapered surface 21, although it will be appreciated that under certain conditions the tapered surface 21 may extend inwardly for a greater distance than indicated without previously interfering with the seal effected by spreading the ring 40 outwardly to perform the initial tightening between said ring and the body surface 21. The outer recessed retaining member 24 is preferably provided with a polygonal outer lowermost end portion to permit the application of a suitable wrench (not shown) whereby to tighten the member 24 firmly in place and hold the seal member 40 against axial displacement outwardly.

The commonly employed lugs 18 throughout may be used to insert and remove the member 12 and 15 conveniently and without disturbing the valve installation on the pipe line as above referred to.

It should be clear that the valve seat insert 29 may be applied to the seat member 7 in any suitable manner of retention, which may be either welded, shrunk, pressed or otherwise retained firmly in position. The valve stem 31 is preferably, but not necessarily, attached integrally to the valve closure member or disc 32, the said disc member having on an under peripheral portion thereof the contact surface 33 for predeterminately bearing against the seat member 29 for effecting the fluid tight seal when the valve is in the closed position illustrated.

The annularly disposed lugs 34 are preferably, but not necessarily, provided on the valve closure member 32 in connection with facilitating the removal of the stem from the stem head as hereinafter referred to when such operation becomes necessary in the course of inspection, repair or replacement subsequently.

On its upper peripheral portion, the valve closure member 32 is provided with an annular surface 35, which, when the valve is in the wide open position, engages the annular sealing surface 36 in the valve body 1, thereby to shield the stuffing box against entry of line fluid.

Around a median portion of the valve stem, the stuffing box bushing 37 is fitted, having above it the male packing adaptor and carrying the packing 39, which packing in the instant illustration is of the chevron type. Above the latter packing and bearing against it, the adaptor 41 is provided against which a packing gland 42 is mounted. It is held in place by means of the gland nut 43 and retained in position by the threads 44 as shown.

Mounted upon the threaded extension 30 of the valve body 1, the yoke 45 is provided having a central chamber 48 therein and within which the stem head 46 is received, carrying on its inner end shoulder portion the oppositely disposed keys 47 engaging the keyways 48 of said yoke. The stem head 46 is threadedly attached as at 49 to the reduced upper reduced end of valve stem 31 as shown. Fitted within the chamber 48 receiving the stem head 46, the yoke sleeve 51 is mounted. The yoke sleeve is annularly flanged at a median portion thereof 59 to receive on upper and lower surfaces of the flange the thrust bearings 52 and 53 respectively. The first-named bearing is supported and shoulder on the inner annular surface 60 of the yoke 45. Within said chamber accommodating the annular flange portion 59 of the yoke sleeve and also the said thrust bearings 52 and 53, an upper retaining apertured nut 54 is threadedly received as at 55 within said chamber of the yoke 45. As indicated, it is provided with the central opening 57 through which the internally threaded yoke sleeve 51 projects outwardly.

After assembly in the manner of the illustrated arrangement, the upper retaining nut 54 is held in locked position by means of the annularly disposed weld 56. Upon suitable rotation of the yoke sleeve 51, it will now become apparent that by virtue of the thread 51 engaging the stem head 46, the stem 3 is moved axially by virtue of the reciprocal travel of the stem head upon the threads 61 within the yoke sleeve 51 depending upon the direction of rotation of the latter member. It will be understood that such rotation of the stem head member is effected by a suitable handwheel, gear, fluid or other motor means (not shown) attached to the stem head square 62, the latter portion being threaded to receive a conventional retaining wheelnut or other suitable means, as at the threads 63. For purpose of lubricating the stem head threads within the stem head 61 of the yoke sleeve 51, a suitable lubricating fitting may be applied at 64 to supply lubricant to the threads 61 of the yoke sleeve as required.

In order to hold the yoke 45 in locked and shouldered position at 50 relative to the threads 30, a preferably headless set screw at 65 may be employed.

It will be further appreciated that under certain conditions of service and for purpose of protecting the packing against the detrimental effect of extremely high temperatures to which a valve of this type is exposed, it is frequently desirable to provide a cooling chamber 66. The latter portion has the cooling chamber outlet sleeve 67 provided with the outlet end portion 68 of said cooling chamber 66. It has suitable means for attachment as at 71 to a cooling source such as a water line for connection with the threaded bushing 70. The latter member may be weld-sealed in position as indicated at 72, although other methods of attachment may obviously be employed if desired.

While in the description hereinabove set forth, no specific metal or material has been mentioned as the material for hardened steel rings may be used for the upper and lower annular sealing rings 23 and 40 respectively. It should, of course, be understood that depending upon the nature of the service encountered in the field, these sealing members may be of materials other than steel. Similarly, this flexibility in the selection of materials also applies to the seat insert 29, which, under some conditions, may be a tungsten carbide material or it may be of other types of materials in light of the service conditions met.

In considering the actual operation of the valve, it will be apparent that by merely rotating the substantially axially immovable yoke sleeve 51 on the respective lower and upper thrust bearings 52 and 53, the stem head 46 and the stem 31 being connected will be moved axially as a unit relative to the valve seat insert 29.

It will be clear that by virtue of line fluid pressure applied to the upper surface 35 of the closure member 32, said pressure will assist in making the valve tight.

It will further be understood that if slight axial movement of the body seat 7 should occur, the sealing member 23 bearing against the tapered surfaces 8 of the body seat 7 and the surface 19 of the valve body will expand slightly outwardly and thus increase the intensity of the sealing relationship between the valve seating members and the casing.

From the above description, it will be clear that an extraordinarily sturdy and durable valve construction has been invented, particularly insofar as the critical seating and fluid sealing is concerned, and, while only a single form has been illustrated and described, it will be apparent that the invention is capable of many forms other than that shown. Thus, it is not intended that the invention should be limited except as required by the spirit and scope of the appended claims.

I claim:

1. In a valve structure suitable for high fluid pressures, the combination of a valve casing having inlet and outlet passages with a communicating substantially cylindrical valve chamber therebetween, the valve chamber being defined for predetermined axially spaced apart portions of its length by upper and lower annular tapered surfaces and an axially aligned threaded portion between said latter surfaces, a body seat having a thickened head portion received in an upper portion of said valve chamber in a plane below the said inlet passage, the said body seat head portion having its outer periphery defined by a frusto-conical surface for fluid-sealing engagement of said upper annular tapered surface of the valve chamber, stem and closure member insertable axially through a lower enlarged opening in said casing valve chamber and being movable axially predeterminately to make fluid sealing contact with said body seat, the said body seat having a central chamber forming an annular depending wall thereon and closed at a lower end of said chamber, the latter wall for a portion thereof being transversely ported in a plane above said closed end of the chamber, a substantially tubular retaining nut for said body seat, a seal ring interposed between an annular tapered surface of said body seat and the upper one of said annular tapered surfaces of the said valve chamber, the said retaining nut engaging said axially aligned threaded portion of said cylindrical valve chamber and having a transversely ported wall portion communicating with the ported wall portion of the said body seat and the said central chamber thereof, said retaining nut receiving said depending wall portion of said body seat for a substantial portion of the length of said wall portion, a body seal plug having a head portion received slidably within a lower enlarged portion of the said valve chamber of the casing, the said plug head portion having an annular tapered surface defining the lower peripheral limit of said head portion, an upper peripheral limit of said plug head portion being defined by a frusto-conical surface for fluid sealing engagement with said lower annular tapered surface of the valve chamber, a second seal ring interposed between the lower one of said annular tapered surfaces of said valve chamber and the said plug head annular tapered surface at said lower peripheral limit thereof, and means for retaining said second seal ring in fluid sealing position against said annular tapered surface defining the lower peripheral limit of the plug head portion and said lower one of said valve chamber annular tapered surfaces.

2. The subject matter of claim 1, the body seal plug member being of substantially solid T-cross section and located immediately adjoining said tubular retaining nut, the said nut threadedly engaging said hollow depending portion of the body seat to retain said first named seal ring in fluid sealing relation on the upper annular tapered surface of the said valve chamber.

3. The subject matter of claim 1, the said body seal plug including a central portion depending below said plug head portion and said second seal ring and a plurality of means respectively engaging said casing in said valve chamber and said body seal plug on said central depending portion to retain said second seal ring in said body chamber in said fluid sealing relation therewith.

References Cited in the file of this patent

UNITED STATES PATENTS

| 2,657,005 | Van Nest | Oct. 27, 1953 |
| 2,767,730 | Laird | Oct. 23 1956 |
| 2,847,183 | Buri | Aug. 12, 1958 |

FOREIGN PATENTS

| 1,215,860 | France | of 1959 |